United States Patent [19]

Schonenberger et al.

[11] Patent Number: 4,905,796
[45] Date of Patent: Mar. 6, 1990

[54] SHOE MOUNTED DISC BRAKE CALIPER ASSEMBLY

[75] Inventors: Eric Schonenberger, Bois Colombes; Gabriel Gregoire, Luzarches, both of France

[73] Assignee: General Motors France, France

[21] Appl. No.: 236,966

[22] Filed: Aug. 25, 1988

[30] Foreign Application Priority Data

Aug. 27, 1987 [GB] United Kingdom ............... 8720225

[51] Int. Cl.[4] .................. F16D 65/38; F16D 65/40; F16D 65/14
[52] U.S. Cl. .................. 188/73.39; 188/73.38; 188/73.43
[58] Field of Search .................. 188/73.1, 73.31–73.38, 188/73.35, 73.36, 73.37, 73.38, 73.39, 73.43, 370

[56] References Cited

U.S. PATENT DOCUMENTS

| 4,134,477 | 1/1979 | Asquith | 188/73.36 X |
| 4,225,017 | 9/1980 | Op den Camp | 188/73.39 X |
| 4,316,530 | 2/1982 | Gehlen et al. | 188/73.39 |
| 4,392,559 | 7/1983 | Oshima | 188/73.32 |
| 4,509,619 | 4/1985 | Baynes et al. | 188/73.39 |
| 4,609,077 | 9/1986 | Nakatsumara | 188/73.39 X |

FOREIGN PATENT DOCUMENTS 0190136 11/1982 Japan ............... 188/73.37

Primary Examiner—Robert J. Oberleitner
Attorney, Agent, or Firm—Ernest E. Helms

[57] ABSTRACT

The present invention provides disc brake caliper assembly for braking a rotary disc brake of a vehicle, the disc brake caliper assembly having a mounting bracket, first and second brake shoes, and a caliper housing mounted solely on the brake shoes and comprising a bridge section for extending across the outer periphery of the rotary disc brake, wherein the mounting bracket has shoulders each spaced from a corresponding aperture, each aperture being positioned outwardly of its corresponding shoulder and having a removable pin mounted therein and extending therefrom, the shoulders, apertures and pins extending in a lengthwise direction substantially parallel to the bridge section of the caliper housing, wherein the mounting bracket also defines an abutment adjacent each shoulder, and wherein each brake shoe has a leg portion extending from each end thereof in a lengthwise direction substantially perpendicular to the bridge section of the caliper housing such that each leg portion is retainable between a corresponding shoulder, pin and abutment on the mounting bracket to mount and retain the brake shoes in the mounting bracket, but to allow sliding movement of the brake shoes in a direction parallel to the lengthwise direction of the shoulders. The invention also provides an arrangement in which the pins are not subjected to the weight of the caliper housing or shoes, and reduces the size of the caliper assembly.

10 Claims, 4 Drawing Sheets

SHOE MOUNTED DISC BRAKE CALIPER ASSEMBLY

This invention relates to a disc brake caliper assembly for braking a rotary disc brake of a vehicle, and in particular to a disc brake caliper assembly in which the caliper housing is fully supported, guided and retained by the brake shoes, and the brake shoes are slidably mounted and retained by the mounting bracket.

Such an arrangement is disclosed in U.S. Pat. No. 4,509,619. In this arrangement all the braking torque forces are transmitted from the brake shoes to the fixed mounting bracket, and the caliper housing is subjected to axial clamping forces only. In one of the arrangements shown in U.S. Pat. No. 4,509,619 the brake shoes are slidably secured to the mounting bracket by pins which pass through U-shaped slots in the brake shoes and through apertures in the mounting bracket. In this known arrangement, with the caliper housing mounted on the brake shoes, the pins have to support the weight of the caliper housing and brake shoes.

It is an object of the present invention to provide an improvement to the above-mentioned known arrangement.

To this end, a disc brake caliper assembly in accordance with the present invention comprises a mounting bracket fixedly securable to the vehicle; first and second brake shoes, having integral brake pads of friction lining material, slidably mounted in and retained by the mounting bracket for selective movement relative thereto to bring the brake pads into frictional engagement with the rotary disc brake; and a caliper housing mounted solely on the brake shoes and comprising a bridge section for extending across the outer periphery of the rotary disc brake, a first leg section extending from the bridge section and having the first brake shoe securably attached thereto, and a second leg section extending from the bridge section and having a selectively actuable piston slidably mounted therein, the second brake shoe being securably attached to the piston, selective actuation of the piston causing the selective movement of the brake shoes; wherein the mounting bracket has shoulders each spaced from a corresponding aperture, each aperture being positioned outwardly of its corresponding shoulder and having a removable pin mounted therein and extending therefrom, the shoulders, apertures and pins extending in a lengthwise direction substantially parallel to the bridge section of the caliper housing; wherein the mounting bracket also defines an abutment adjacent each shoulder; and wherein each brake shoe has a leg portion extending from each end thereof in a lengthwise direction substantially perpendicular to the bridge section of the caliper housing such that each leg portion is retainable between a corresponding shoulder, pin and abutment on the mounting bracket to mount and retain the brake shoes in the mounting bracket, but to allow sliding movement of the brake shoes in a direction parallel to the lengthwise direction of the shoulders.

The present invention has the advantage that the pins which retain the brake shoes in the mounting bracket do not support the weight of the caliper housing or the brake shoes. As a consequence, the pins can be reduced in size and strength. An additional advantage of the present invention is that because of the arrangement of shoulders and pins on the mounting bracket, and the leg portions on the brake shoes, the overall length of the mounting bracket and the brake shoes can be reduced (when compared to the above-mentioned known arrangement), thereby providing a reduction in overall weight, and a saving in material and cost.

Preferably, the first brake shoe is securably attached to the first leg section by a first retainer spring and the second brake shoe is securably attached to the piston by a second retainer spring.

The mounting bracket preferably has four shoulders and four apertures. In this case, the shoulders preferably define two pairs of shoulders, with the shoulders in each pair lying in a common plane, and the corresponding apertures of each pair of shoulders are aligned. Each pair of aligned apertures preferably has a common removable pin which defines the removable pin mounted therein.

Preferably, each abutment is defined by a face which extends outwardly in a plane substantially perpendicular to the plain of its adjacent shoulder.

The disc brake caliper assembly preferably includes an anti-rattle spring for substantially preventing rattle of the caliper housing and brake shoes.

The present invention will now be described, by way of example, with reference to a preferred embodiment as shown in the accompanying drawings, in which.

Figure 1:
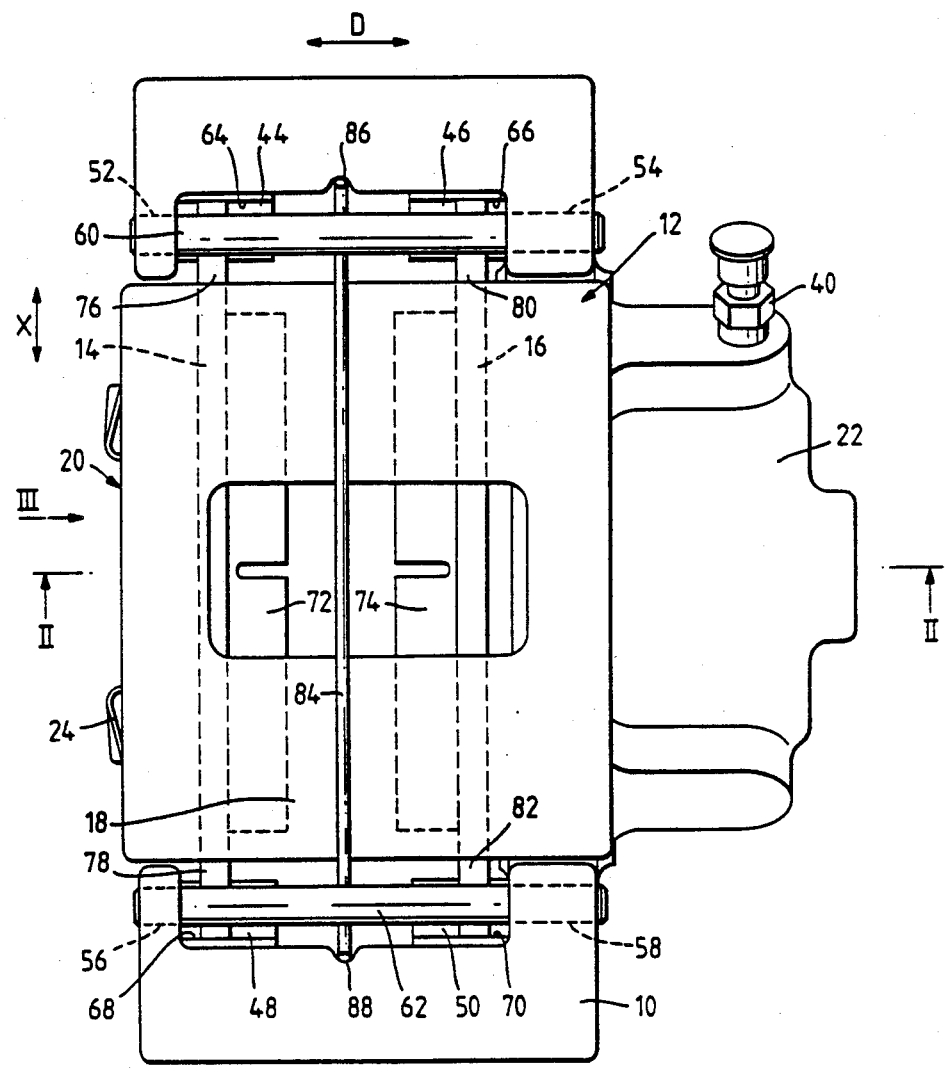
FIG. 1 is a top view of a disc brake caliper assembly in accordance with the present invention.

Referring to the drawings, the disc brake caliper assembly comprises a mounting bracket 10, a caliper housing 12, and first and second brake shoes 14, 16 respectively. The disc brake caliper assembly straddles a rotary disc brake (not shown), with a portion of the rotary disc brake being positioned between the two brake shoes 14, 16.

The caliper housing 12 comprises a bridge section 18 which extends across the outer periphery of the rotary disc brake (not shown), and first and second leg sections 20, 22 respectively extending from the bridge section at each end thereof. The first brake shoe 14 is secured to the first leg section 20 by a first retainer spring 24. A piston 26 is slidably mounted in the second leg section 22. The piston 26 is selectively actuable (in the well known manner) by hydraulic fluid entering, through opening 36, a chamber 28 defined by walls 34 in the second leg section 22. A seal 30 substantially prevents the hydraulic fluid from the chamber 28 leaking around the piston 26. A flexible boot 32 substantially prevents ingress of dirt or moisture between the piston 26 and the walls 34 of the chamber 28 which could damage the seal 30. The second brake shoe 16 is secured to the piston 26 by a second retainer spring 38. The chamber 28 has the usual bleed valve 40.

The mounting bracket 10 has two openings 42 through which a threaded stud (not shown) may pass for fastening the mounting bracket, and hence the disc brake caliper assembly, to an axle (not shown) of a vehicle. The mounting bracket 10 defines four shoulders 44, 46, 48, 50 and has four corresponding apertures 52, 54, 56, 58, spaced from their respective shoulders. The apertures 52–58 are positioned outwardly of their corresponding shoulders 44–50. The shoulders 44–50 and the apertures 52–58 extend in a lengthwise direction D substantially parallel to the bridge section 18 of the caliper housing 12. Pairs 44, 46 and 48, 50 of the shoulders lie in a common plane, and similarly pairs 52, 54 and 56, 58 of the apertures are aligned. A removable pin 60 passes through the aligned apertures 52, 54 and extends therebetween. Similarly, a removable pin 62 passes through, and extends between, the aligned apertures 56, 58. The mounting bracket also defines an abutment face 64, 66, 68, 70 adjacent each shoulder each of which extends outwardly in a plane substantially perpendicular to its adjacent shoulder.

Each brake shoe 14, 16 has an integral brake pad 72, 74 respectively of friction lining material, and a leg portion 76, 78, 80, 82 respectively extending from each end thereof in a lengthwise direction X substantially perpendicular to the bridge section 18 of the caliper housing 12. When assembled, the leg portions 76–82 of the brake shoes 14, 16 are trapped between the shoulders 44–50, pins 60, 62 and abutment faces 64–70 of the mounting bracket 10 in such a way that movement of the brake shoes relative to the mounting bracket in the direction X is substantially prevented, but that relative sliding movement in the direction D is not prevented. Selective actuation of the piston 26 of the caliper housing 12 causes selective sliding movement of the brake shoes 14, 16 to bring the brake pads 72, 74 into frictional engagement with the rotary disc brake (not shown).

An anti-rattle spring 84 extends between the two pins 60, 62 and at its ends engages slots 86, 88 in the mounting bracket 10. The anti-rattle spring 84 helps to minimize rattling of the caliper housing 12 and brake shoes 14, 16 during use of the disc brake caliper assembly.

As can be seen from this arrangement, the caliper housing 12 is mounted solely on the brake shoes 14, 16, and is therefore fully supported, guided and retained by the brake shoes. The brake shoes 14, 16 are slidably mounted on and retained by the mounting bracket 10. Consequently, all braking torque forces are transmitted directly from the brake shoes 14, 16 to the mounting bracket 10. The caliper housing 12 is therefore subjected to axial clamping forces only. Further, because the leg portions 76–82 of the brake shoes 14, 16 are retained between shoulders 44–50 and pins 60, 62 on the mounting bracket 10, the weight of the caliper housing 12 and brake shoes is supported directly by the mounting bracket, and not by the pins. Further, because of the arrangement of the pins 60, 62 and shoulders 44–50, the overall length (in the direction X) of the disc brake caliper assembly, when compared to the above-mentioned known arrangement, can be reduced.

In order to replace worn or damaged brake shoes, the pins 60, 62 are removed, followed by the anti-rattle spring 84 and then the caliper housing 12. The worn brake shoes are then removed from the caliper housing 12 and replaced by new ones. The disc brake caliper assembly is then reassembled in the reverse order.

Figure 2:
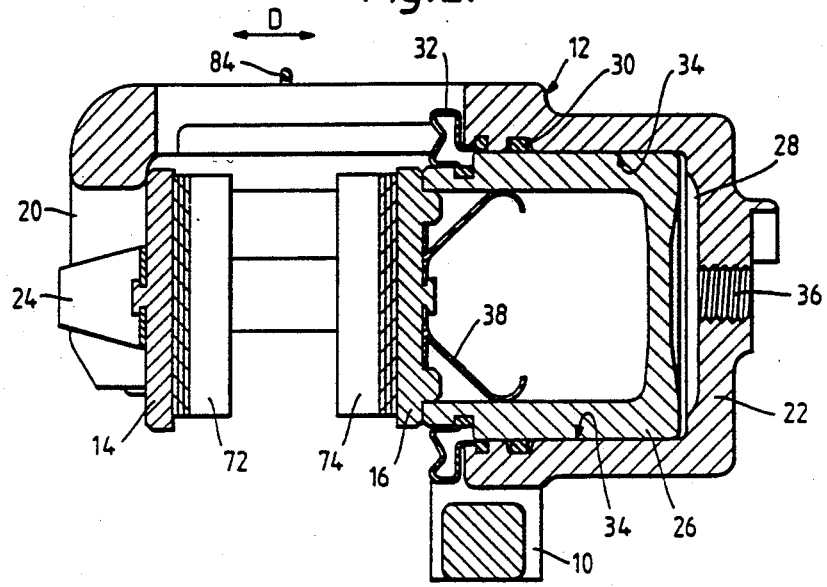
FIG. 2 is a cross-sectional view along the line 2—2 in FIG. 1.
Figure 3:
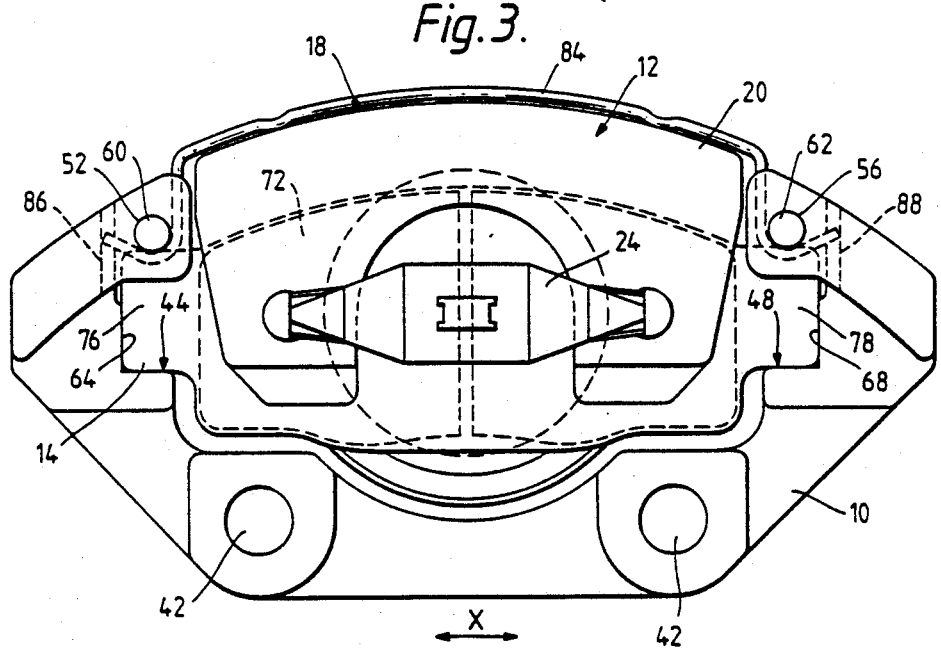
FIG. 3 is a side view in the direction 3 of FIG. 1.
Figure 4:
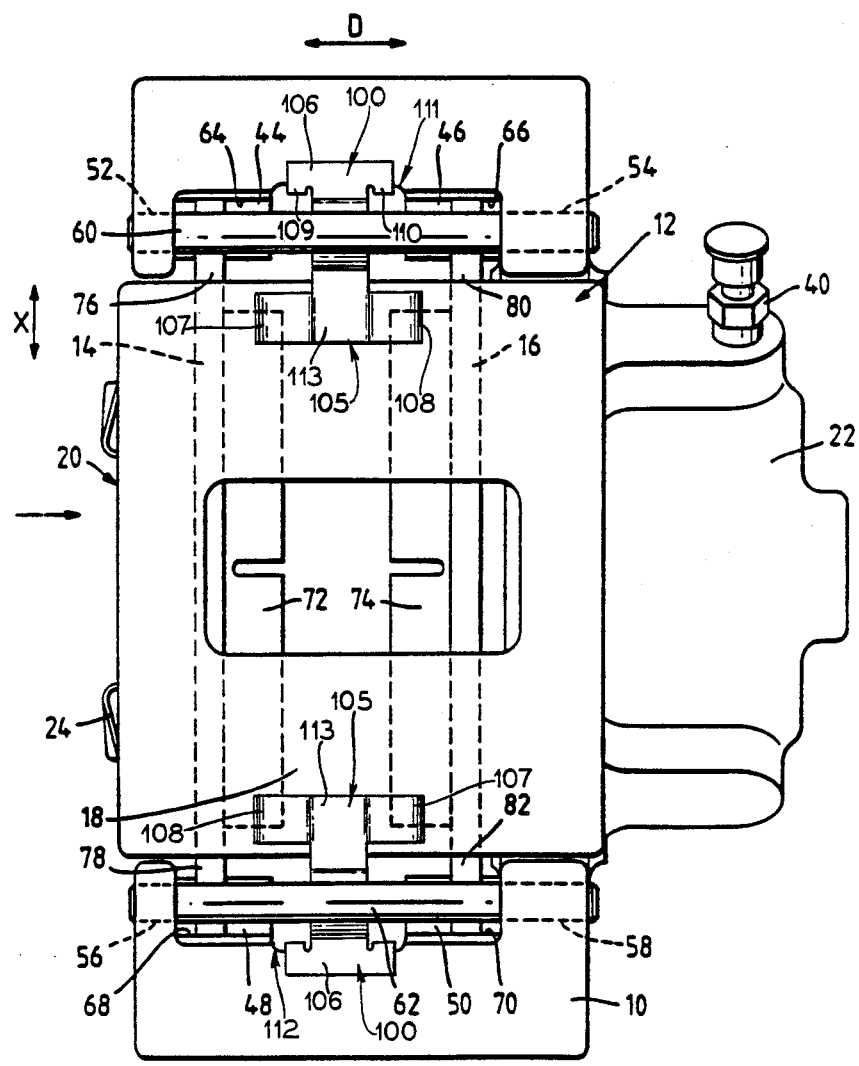
FIG. 4 is a view similar to FIG. 1 illustrating an alternative embodiment of the present invention.
Figure 5:
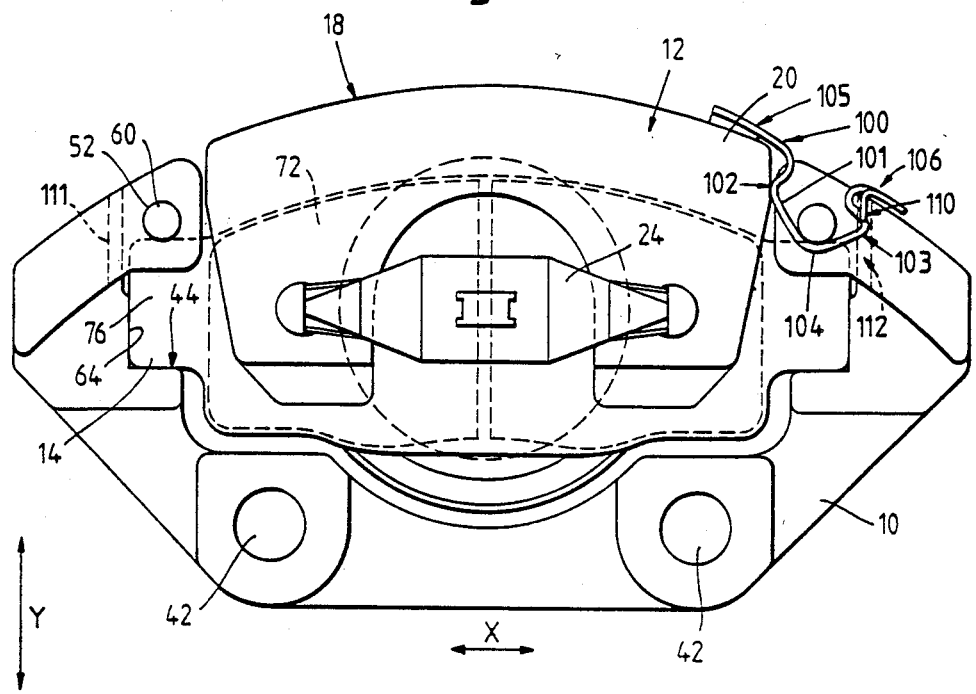
FIG. 5 is a side view in the direction 5 of FIG. 4.
Figure 6:
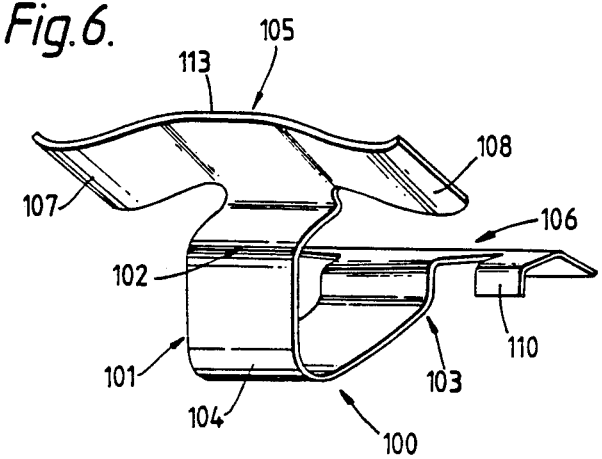
FIG. 6 is perspective view of the anti-rattle spring.

In the alternative embodiment shown in FIGS. 4 to 6, like parts have been given the same reference number. As can be seen, the anti-rattle spring 84 shown in FIGS. 1 to 3 has been replaced by two sheet metal anti-rattle springs 100 (only one is shown in FIG. 5, for clarity).

These anti-rattle springs 100 are substantially H-shaped, and have a center portion 101 and two extending legs 105 (first), 106 (second). the center portion 101 is bent to define two abutment portions 102 (first), 103 (second), and a centrally positioned curved portion 104. In use, abutment portion 102 engages the caliper housing 12, and abutment portion 103 engages the mounting bracket 10. This arrangement damps the movement of the caliper housing 12 in the direction X. Further, the curved portion 104 engages behind the removable pins 60, 62 to secure the anti-rattle spring 100 in position.

One, 105, of the extending legs 105, 106 of each anti-rattle spring 100 engages the caliper housing 12, and, due to the elastic deformation of the extending leg 105, damps the movement of the caliper housing 12 in the direction Y (FIG. 5). The free ends 107, 108 of the extending leg 105 are slightly curved (away from the caliper housing 12) to reduce friction between the caliper housing 12 and the anti-rattle spring 100.

The other 106 of the extending legs engages the mounting bracket 10, and has a tab 109, 110 adjacent each free end of the extending leg 106, which are bent out of the plane of the extending leg 106 so that the tabs 109, 110 can be positioned in a slot 111, 112 in the mounting bracket 10. This arrangement substantially prevents movement of the anti-rattle spring 100 in the direction D when the caliper housing 12 moves in the same direction to allow the wear of the brake pads 72, 74.

This design of anti-rattle spring 100 can be easily installed by pushing the central region 113 of the extending leg 105 towards the caliper housing 12. This movement causes the free ends 107, 108 to deflect, and the curved portion 104 to move to allow insertion of the removable pins 60, 62. The pressure on the central region can then be released to secure the anti-rattle spring 100 in position.

This particular design of anti-rattle spring 100 can be manufactured from very thin material that therefore allows the disc brake caliper assembly to be positioned very close to the rotary disc brake. Further advantages include that these flat springs are cheaper than wire ones, and are much easier to handle during manufacture of the disc brake caliper assembly.

The embodiments of the invention in which an exclusive property or privilege is claimed are defined as follows:

1. A disc brake caliper assembly for braking a rotary disc brake of a vehicle, the disc brake caliper assembly comprising a mounting bracket fixedly securable to the vehicle;
   first and second brake shoes, having integral brake pads of friction lining material, slidably mounted in and retained by the mounting bracket for selective movement relative thereto to bring the brake pads into frictional engagement with the rotary disc brake;
   a caliper housing mounted solely on the brake shoes and comprising a bridge section for extending across the outer periphery of the rotary disc brake, a first leg section extending from the bridge section and having the first brake shoe securably attached thereto by a first retainer spring, and a second leg section extending from the bridge section and having a selectively actuable piston slidably mounted therein, the second brake shoe being securably attached to the piston by a second retainer spring, selective actuation of the piston causing the selective movement of the brake shoes; wherein the mounting bracket has shoulders each spaced from a corresponding aperture, each aperture being positioned outwardly of its corresponding shoulder and having a removable pin mounted therein and extending therefrom, the shoulders, apertures and pins extending in a lengthwise direction substantially parallel to the bridge section of the caliper housing; wherein the mounting bracket also defines an abutment adjacent each shoulder; and wherein each brake shoe has a leg portion extending from each end thereof in a lengthwise direction substantially perpendicular to the bridge section of the caliper housing such that each leg portion is retainable between a corresponding shoulder, pin and abutment on the mounting bracket to mount and retain the brake shoes in the mounting bracket, but to allow sliding movement of the brake shoes in a direction parallel to the lengthwise direction of the shoulders.

2. A disc brake caliper assembly as described in claim 1, wherein each abutment is defined by a face which extends outwardly in a plane substantially perpendicular to the plane of its adjacent shoulder.

3. A disc brake caliper assembly as described in claim 1 further including an anti-rattle spring separate from the first and second retainer springs and non contacting with said brake shoes for substantially preventing rattle of the caliper housing and brake shoes.

4. A disc brake caliper assembly as described in claim 1 further including an anti-rattle spring separate from the first and second retainer springs and non contacting of said brake shoes, the anti-rattle spring being fabricated from a sheet material for substantially preventing rattle of the caliper housing and brake shoes.

5. A disc brake caliper assembly as described in claim 4 wherein said anti-rattle spring is substantially H-shaped with a center portion and first and second legs.

6. A disc brake caliper assembly as described in claim 5 wherein said anti-rattle spring center portion is bent to define first and second abutment portions and a centrally positioned curve portion, and said first abutment portion engages said caliper housing and said second abutment portion engages said mounting bracket.

7. A disc brake caliper assembly as described in claim 6 wherein said anti-rattle spring centrally positioned curved portion engages behind said removable pin to secure said anti-rattle spring.

8. A disc brake caliper assembly as described in claim 5 wherein said first leg of said anti-rattle spring engages said caliper housing.

9. A disc brake caliper assembly as described in claim 5 wherein said second leg of said anti-rattle spring engages said mounting bracket.

10. A disc brake caliper assembly for braking a rotary disc brake of a vehicle, the disc brake caliper assembly comprising a mounting bracket fixedly securable to the vehicle;

first and second brake shoes, having integral brake pads of friction lining material, slidably mounted in and retained by the mounting bracket for selective movement relative thereto to bring the brake pads into frictional engagement with the rotary disc brake;

a caliper housing mounted solely on the brake shoes and comprising a bridge section for extending across the outer periphery of the rotary disc brake, a first leg section extending from the bridge section and having the first brake shoe securably attached thereto by a first retainer spring, and a second leg section extending from the bridge section and having a selectively actuable piston slidably mounted therein, the second brake shoe being securably attached to the piston by a second retainer spring, selective actuation of the piston causing the selective movement of the brake shoes; wherein the mounting bracket has shoulders each spaced from a corresponding aperture, each aperture being positioned outwardly of its corresponding shoulders and having a removable pin mounted therein and extending therefrom, the shoulders, apertures and pins extending in a lengthwise direction substantially parallel to the bridge section of the caliper housing; wherein the mounting bracket also defines an abutment adjacent each shoulder;

wherein each brake shoe has a leg portion extending from each end thereof in a lengthwise direction substantially perpendicular to the bridge section of the caliper housing such that each leg portion is retainable between a corresponding shoulder, pin and abutment on the mounting bracket to mount and retain the brake shoes in the mounting bracket, but to allow sliding movement of the brake shoes in a direction parallel to the lengthwise direction of the shoulders; and an anti-rattle spring for substantially preventing rattle of the caliper housing and brake shoes, said anti-rattle spring being fabricated from a sheet material and is substantially H-shaped with a center portion and first and second legs with the center portion being bent to define first and second abutment portions and a centrally positioned curve portion, the first abutment portion engages the caliper housing and the second abutment portion engages the mounting bracket, and the centrally positioned curved portion engages behind the removable pin to secure the anti-rattle spring.

* * * * *